US011641424B1

(12) United States Patent
Csabi et al.

(10) Patent No.: US 11,641,424 B1
(45) Date of Patent: May 2, 2023

(54) CALL ROUTING USING ARTIFICIAL INTELLIGENCE

(71) Applicant: United Services Automobile Association (USAA), San Antonio, TX (US)

(72) Inventors: Rachel Elizabeth Csabi, Frisco, TX (US); Hollie Ilene King, Frisco, TX (US); Victor Kwak, Frisco, TX (US); Zachery C. Lake, The Colony, TX (US); Yogen Rai, Frisco, TX (US); Samantha Elizabeth Taylor, Frisco, TX (US); Nicholas C. Wheeler, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/002,508

(22) Filed: Aug. 25, 2020

Related U.S. Application Data

(60) Provisional application No. 62/892,153, filed on Aug. 27, 2019.

(51) Int. Cl.
*H04M 3/00* (2006.01)
*H04M 5/00* (2006.01)
(Continued)

(52) U.S. Cl.
CPC ............ *H04M 3/5232* (2013.01); *G06N 5/04* (2013.01); *G06N 20/00* (2019.01); *G10L 15/22* (2013.01);
(Continued)

(58) Field of Classification Search
CPC ........... H04M 3/493; H04M 2203/355; H04M 3/5166; H04M 3/4938; H04M 3/4936; H04M 3/5175; H04M 3/5183; H04M 3/5191; H04M 2203/555; H04M 3/42068; H04M 2203/551; H04M 2203/2038; H04M 2203/2077; H04M 3/5235; H04M 3/42221; G06N 20/00; G06N 7/005; G06N 3/08; G06N 5/048; H04L 67/306; H04L 67/22; H04L 41/5032; H04L 41/5064; H04L 51/16; H04L 67/20
(Continued)

(56) References Cited

U.S. PATENT DOCUMENTS

| | | | |
|---|---|---|---|
| 8,379,830 B1 * | 2/2013 | Naik | H04M 3/493 379/265.02 |
| 10,637,991 B1 * | 4/2020 | Chan | H04M 3/42068 |
| 11,348,601 B1 * | 5/2022 | Deshpande | G10L 25/30 |
| 2006/0115070 A1 * | 6/2006 | Bushey | H04M 3/5166 379/265.02 |

(Continued)

*Primary Examiner* — Kharye Pope
(74) *Attorney, Agent, or Firm* — Fletcher Yoder, P.C.

(57) ABSTRACT

Systems and methods are provided for dynamic routing of an automated telephony system. The automated telephony system facilitates functions desired by a caller, via an automated call with the caller. A machine-learning analysis system extracts data from the automated call, performs machine-learning via the extracted data to identify a likely motivation of the caller associated with the automated call, and provides the likely motivation to the automated telephony system. The automated telephony system then receive the likely motivation from the machine-learning analysis system and dynamically routes the automated call based upon the likely motivation.

20 Claims, 4 Drawing Sheets

(51) Int. Cl.
*H04M 3/523* (2006.01)
*H04M 3/51* (2006.01)
*G10L 25/63* (2013.01)
*G10L 25/90* (2013.01)
*G06N 20/00* (2019.01)
*G06N 5/04* (2006.01)
*G10L 15/22* (2006.01)
*H04L 12/66* (2006.01)

(52) U.S. Cl.
CPC .............. *G10L 25/63* (2013.01); *G10L 25/90* (2013.01); *H04M 3/5166* (2013.01); *H04M 3/5183* (2013.01); *H04M 2203/2061* (2013.01); *H04M 2203/40* (2013.01)

(58) Field of Classification Search
USPC ...... 379/265.09, 221.14; 370/352; 705/14.53
See application file for complete search history.

(56) References Cited

U.S. PATENT DOCUMENTS

| | | | |
|---|---|---|---|
| 2013/0163741 A1* | 6/2013 | Balasaygun | H04M 3/4935 379/211.01 |
| 2014/0220526 A1* | 8/2014 | Sylves | G06Q 10/06395 434/238 |
| 2015/0193840 A1* | 7/2015 | Punukollu | G06Q 30/0255 705/14.53 |
| 2017/0054852 A1* | 2/2017 | McGreevy | H04M 3/5166 |
| 2017/0103346 A1* | 4/2017 | Bodell | G06Q 30/016 |
| 2017/0140387 A1* | 5/2017 | Nandi | G06Q 30/016 |
| 2017/0316438 A1* | 11/2017 | Konig | G06Q 30/0204 |
| 2018/0227420 A1* | 8/2018 | Burg | H04L 41/507 |
| 2019/0095927 A1* | 3/2019 | Shimpi | G06N 5/025 |
| 2020/0028968 A1* | 1/2020 | Mendiratta | H04M 3/5238 |
| 2020/0097981 A1* | 3/2020 | Teo | G06Q 30/0281 |
| 2020/0117858 A1* | 4/2020 | Freeman | G06F 40/35 |

* cited by examiner

CALL ROUTING USING ARTIFICIAL INTELLIGENCE

CROSS-REFERENCE TO RELATED APPLICATION

The present disclosure is related to, and claims priority to, U.S. Provisional Patent Application Ser. No. 62/892,153, entitled "Call Routing Using Artificial Intelligence," which was filed on Aug. 27, 2019, and which is herein incorporated by reference in its entirety for all purposes.

BACKGROUND

The present disclosure relates generally to dynamic call routing using advanced machine learning techniques.

As automated systems become more sophisticated and reliance on human customer service representatives decreases, automated call center systems may perform an increasing number of functions. Unfortunately, however, this increase in functionality may create navigation difficulties, as call routing trees (e.g., navigation paths to particular desired functions for the call) may become extremely complex, hindering a caller's ability to reach the desired function in an efficient manner. Further, some functions handled by these systems, when not handled in an efficient manner, may lead to increased stress of the callers, inability to complete transactions, and/or other undesirable experiences.

DRAWINGS

These and other features, aspects, and advantages of the present disclosure will become better understood when the following detailed description is read with reference to the accompanying drawings in which like characters represent like parts throughout the drawings, wherein:

FIG. 6 is a flowchart, illustrating a process for identifying recent activities that may be associated with a call for dynamic routing purposes, in accordance with an embodiment of the present disclosure;

FIG. 7 is a flowchart, illustrating a process for dynamically routing calls based upon a location of the source of the call, in accordance with an embodiment of the present disclosure;

FIG. 8 is a flowchart, illustrating a process for predicting events associated with the call based upon the location of the source of the call, in accordance with an embodiment of the present disclosure.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward dynamic call routing using artificial intelligence. As will be discussed in more detail below, machine learning may be used to identify call characteristics useful for determining dynamic call routing. In some embodiments, such dynamic call routing may be used to mitigate overall member stress, resulting in a better member experience.

Figure 1:
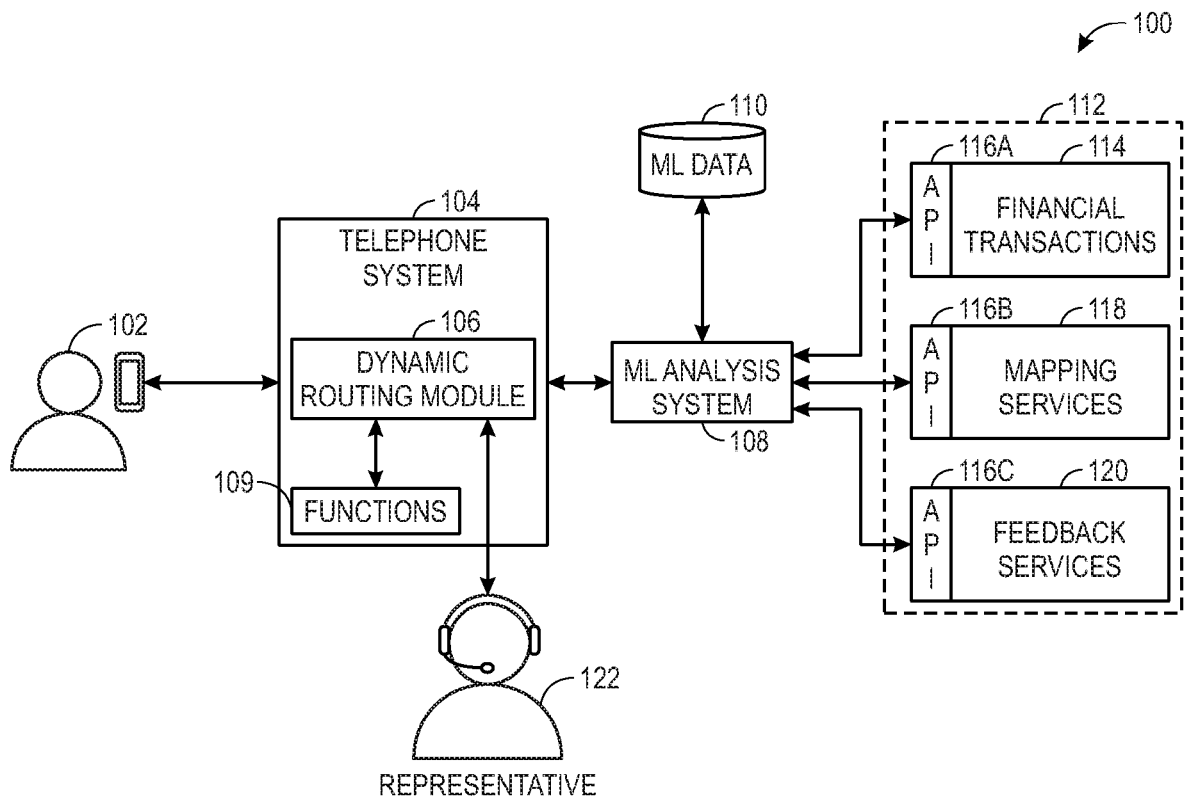
FIG. 1 is a schematic block diagram, illustrating an automated call center system that uses machine learning and/or other artificial intelligence to dynamically route calls, in accordance with an embodiment of the present disclosure.

FIG. 1 is a schematic block diagram, illustrating an automated call center system 100 that uses machine learning and/or other artificial intelligence to dynamically route calls, in accordance with an embodiment of the present disclosure. The system 100 facilitates calls from a caller 102. A telephony system 104 may intercept a call from the caller 102 made to a particular phone number. A dynamic routing module 106, may use machine learning outputs of a machine learning analysis system 108 to dynamically route the caller through a call routing tree to ultimately implement a function 109 and/or provide contact to a representative 122 that the caller 102 desires. The dynamic routing can change from caller-to-caller, as observed characteristics input into the machine learning analysis system 108 change results of the machine learning analysis system 108.

The machine learning analysis system 108 may receive a set of call characteristics, which it uses to determine particular priorities and/or functions that may be associated with the call. Machine learning data 110 may include historical data or other training data that is used by the machine learning analysis system 108 to identify a subset of the input characteristics that may be useful in determining prioritization or function identification for the call. Further, certain external/third-party data sources 112 may provide input data for the machine learning analysis system 108. For example, financial transactions 114 may be provided via an application programming interface (API) 116A, mapping services 118 may be provided by API 116B, and feedback services 120 (e.g., ratings of customer service representatives 122 or other call recipients) may be provided by API 116C.

The dynamic routing module 106 may receive, as input, an output of the machine learning analysis system 108, which indicates a priority for the call and/or likely functions that are the motivation for the call. This may be determined, by observing patterns of training data of the machine learning data 110 that are present in the characteristics of the current call. As mentioned above, characteristics of the current call can include characteristics observed from the call content (e.g., the audio data of the call and/or selected prompts of the call) and can also include other content that is derived external from the call content (e.g., demographic data of the caller, transactions associated with the caller 102 that occur near in time to the call, etc.).

The dynamic routing module 106 may alter an available routing tree provided to the caller 102 based upon the data from the machine learning analysis system 108. For example, the machine learning analysis system 108 may provide an indication that the call is likely a high stress call that should be prioritized for quick resolution. In such a case, the dynamic routing module 106 may provide a relatively quick path in the routing tree to a human representative 122 as compared to those calls that are indicated as having a lower priority toward quick resolution.

In some cases the machine learning analysis system 108 may provide an indication of particular predicted functions from the functions 109 that the caller 102 desires. In such embodiments, the routing tree provided to the caller may prioritize these predicted functions in the list of routing options, potentially enabling the caller 102 to reach their intended functions faster.

Figure 2:
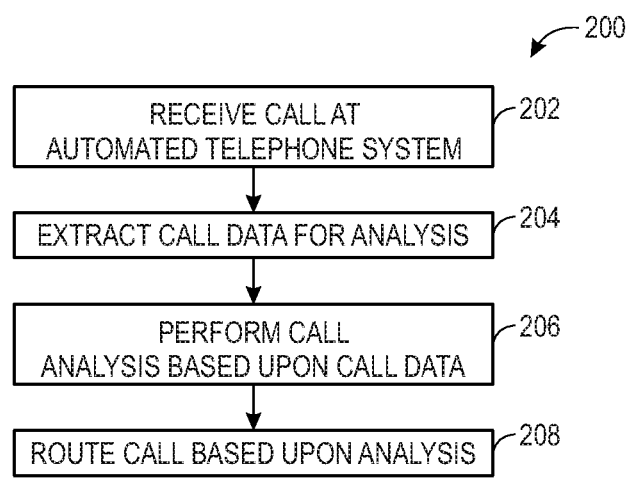
FIG. 2 is a flowchart, illustrating a process for dynamically routing calls using artificial intelligence, in accordance with an embodiment of the present disclosure.

FIG. 2 is a flowchart, illustrating a process 200 for dynamically routing calls using artificial intelligence, in accordance with an embodiment of the present disclosure. The process 200 begins by receiving a call at an automated telephony system (block 202). The call may be facilitated via traditional telephone lines, cellular telephone lines, voice over IP (VoIP) or other communication lines.

The call may be analyzed to extract certain data useful for machine learning (block 204). For example, voice timbre, speech speed (e.g., number of words per minute), speech loudness, etc. may be useful in indicating a psychological state of the caller. Further, characteristics of the source of the call (e.g., location where the call was made, a particular electronic device used to make the call, a particular phone number used to reach the automated telephony system 104) may be used to indicate certain attributes of the call. Additionally and/or alternatively, external factors that can be linked to the call (e.g., activities associated with the caller that are temporal with the call) can also provide clues regarding the motivation for the call and may be captured.

Call analysis may be performed using the call data (block 206). For example, supervised or unsupervised machine learning may be used to identify patterns of data that indicate likely motivations for the call. As described herein, training data may provide data that corresponds to particular motivations. Call data captured in block 204 may be associated with a common motivation of training data that has similar data patterns. As motivations are continued to be discerned, these subsets of data and their attributed motivations may be fed back into the system as new training data to increase machine-learning knowledge.

The call may be dynamically routed based upon the analysis of the call data (block 208). For example, a caller may be automatically directed to a particular function when a confidence level of the discerned motivation is over a first threshold. For example, if the preset threshold is 90% confidence and the analysis indicates a 92% confidence that the caller is calling to activate a recently mailed credit card, the caller may be automatically directed to activating the credit card.

When the confidence interval does not reach the first threshold, routing options for the most likely motivations may be presented. For example, when the first threshold is 90% and there is a 50% likelihood that the user is calling to activate a credit card and a 50% chance that they are calling to view a card balance, two options may be presented to the caller in the form of voice prompts. For example, the telephony system 104 may prompt the caller by stating "Press 0 to activate a credit card and press 1 to view an account balance." The prompts may dynamically change as the likely motivations discerned by the system change.

Figure 3:
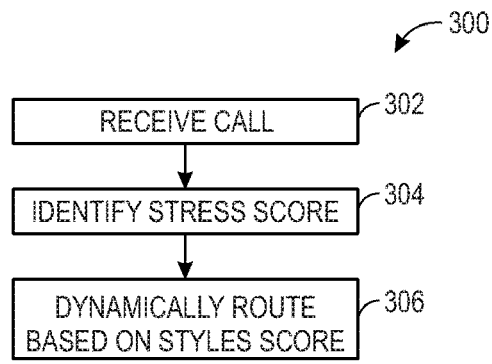
FIG. 3 is a flowchart, illustrating a process for generating a stress score, which is used for dynamic call center routing, in accordance with an embodiment of the present disclosure.
Figure 4:
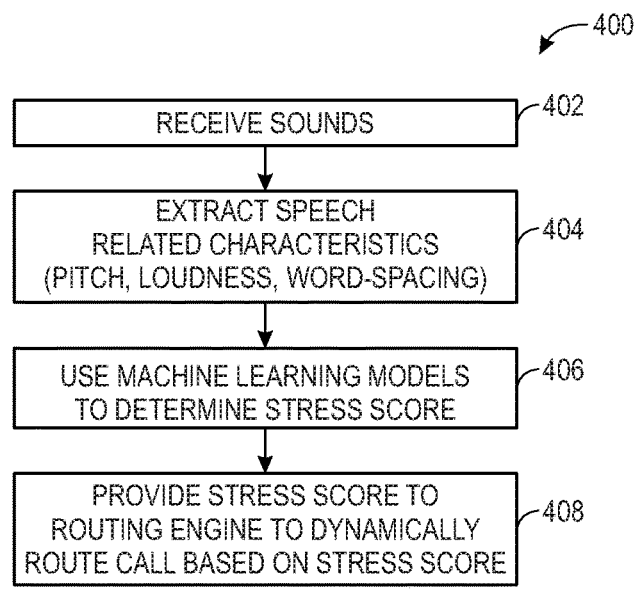
FIG. 4 is a flowchart, illustrating a process for generating a stress score, in accordance with an embodiment of the present disclosure.

Caller stress may be used to prioritize call completion. For example, stressful events may be exacerbated by complex automated call system prompts or lagged completion of desired call functions. FIG. 3 is a flowchart, illustrating a process 300 for generating a stress score, which is used for dynamic call center routing, in accordance with an embodiment of the present disclosure. The process 300 begins by receiving a call (block 302). A stress score may be determined for the call (block 304). For example, FIG. 4 is a flowchart, illustrating a process 400 for generating a stress score, in accordance with an embodiment of the present disclosure. The process 400 begins by receiving sounds of the call (block 402). Speech-related characteristics, such as pitch loudness, word-spacing, etc.) may be obtained from the sounds (block 404). Machine-learning models may be used to determine a level of likely stress and, thus, a representative stress score (block 406). The machine-learning models may use training data representative of known varied stress levels to discern patterns in the speech-related characteristics extracted in block 404. The stress score may be provided to the routing engine to dynamically route the call based on the stress score (block 408).

Returning to FIG. 3, the stress score may be used to dynamically route the call (block 306). For example, when a relatively high stress level is indicated by a relatively high stress score, an option to reach a human representative may be provided relatively quickly as opposed to a call with a relatively low stress level score, where a human representative option may be provided only after a number of prompts or not at all.

Figure 5:
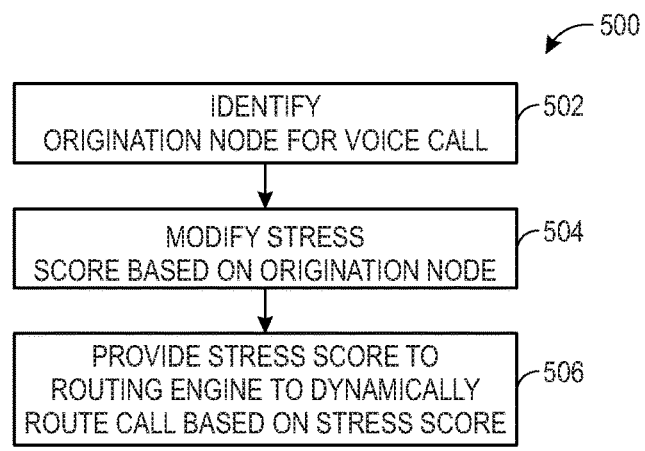
FIG. 5 is a flowchart, illustrating a process for modifying a stress score based upon characteristics of an origination source of the call, in accordance with an embodiment of the present disclosure.

FIG. 5 is a flowchart, illustrating a process 500 for modifying a stress score based upon characteristics of an origination source of the call, in accordance with an embodiment of the present disclosure. The process 500 begins by identifying an origination node for the call (block 502). For example, the origination node identification may include identifying a number dialed to reach the automated system, a particular phone number or device used to call the automated system, etc. This identification may provide an indication of the likely stress associated with the call. For example, a particular phone number dialed to reach the automated system may be associated with relatively stressful situations, such as credit being declined at a particular point of sale. Further, particular devices or phone numbers used to make the call may provide such an indication. For example, a call from a merchant may indicate the likely motivation being an inquiry regarding declined credit transactions at a point of sale.

The stress score may be modified based upon identifying these origination nodes (block 504). For example, when relatively stressful situations are indicated by the origination node, a stress score adjustment may adjust up the stress score. Further, when the relatively less stressful situations are indicated by the origination node, a stress score adjustment may adjust down the stress score. The modified stress score may then be provided to the routing engine to dynamically route the calls (block 506).

Figure 6:
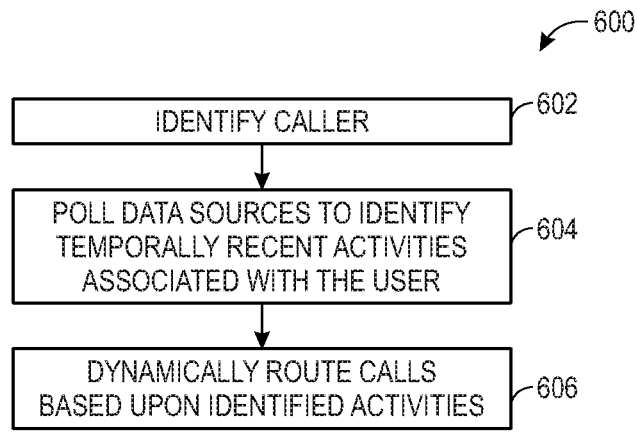
FIGS. 6-8 are flowcharts, illustrating particular processes associated with characteristics of an origination source.
Figure 7:
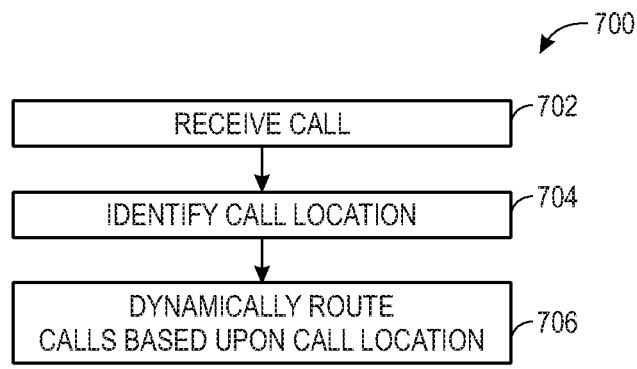
Figure 8:
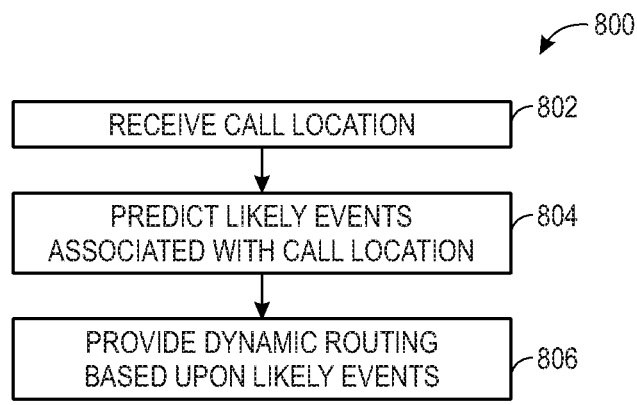

FIGS. 6-8 are flowcharts, illustrating particular processes associated with characteristics of an origination source. FIG. 6 is a flowchart, illustrating a process 600 for identifying recent activities that may be associated with a call for dynamic routing purposes, in accordance with an embodiment of the present disclosure. The process 600 begins with identifying the caller (block 602). For example, this may be done by an automated prompt asking the caller to input caller-identifying information, such as a social security number, an account number associated with the caller, etc. In some instances, the caller's phone number used to make the call may provide an indication of the of the identity of the caller.

Once the caller's identity is known, data sources may be polled to identify temporally recent activities associated with the caller (block 504). For example, the external/third-party data sources 112 of FIG. 1 may be polled using the APIs 116A, 116B, and/or 116C to identify temporally recent activities.

These recent activities may provide a likely motivation for the call. For example, if results returned from the financial transactions source 114 indicate that a recent transaction was declined within a relatively recent time window (e.g., the last 10 minutes, last 30 mins, etc.), the likely motivation for the call may be to resolve the declined credit issue. The call routing may be dynamically updated based upon the identified activities (block 606). For example, the routing tree may be updated to include options for the identified likely motivation that is based upon the identified activities and/or the caller may be automatically directed to a function associated with the likely motivation. Once again, the confidence level for the likely motivation may dictate whether the caller is automatically routed to the function or given the function as an option with other function options.

FIG. 7 is a flowchart, illustrating a process 700 for dynamically routing calls based upon a location of the source of the call, in accordance with an embodiment of the present disclosure. FIG. 8 is a flowchart, illustrating a process 800 for predicting events associated with the call based upon the location of the source of the call, in accordance with an embodiment of the present disclosure. For simplicity, these processes will be discussed together.

The process 700 begins with receiving a call (block 702). The call location is identified (block 704). The call location may provide an indication of a likely motivation for the call. For example, when a call is made from this caller's home, this may eliminate some likely motivations. For example, this location is not likely associated with point of sale credit declines. Thus, these motivations may be eliminated from the likely possible motivations. The call may be dynamically routed based upon the call location (block 706).

Accordingly, the process 800 begins with receiving a call location (block 802). Likely events associated with the location can be predicted based upon the call location (block 804). For example, likely motivations may be identified and/or eliminated to discern a subset of motivations that are relatively more likely based upon the location.

The processes 700 and 800 end by dynamically routing the calls based upon the call location and the likely events, respectively. For example, as described herein, the routing tree may be modified and/or automatic routing to a particular function may be provided. In some embodiments, a determination of which of these options is provided is based upon a level of confidence of the likely motivation. Further, certain options may be provided based upon the stress score associated with the event. For example, an option to reach a human operator may be presented for relatively high stress likely motivations.

Figure 9:
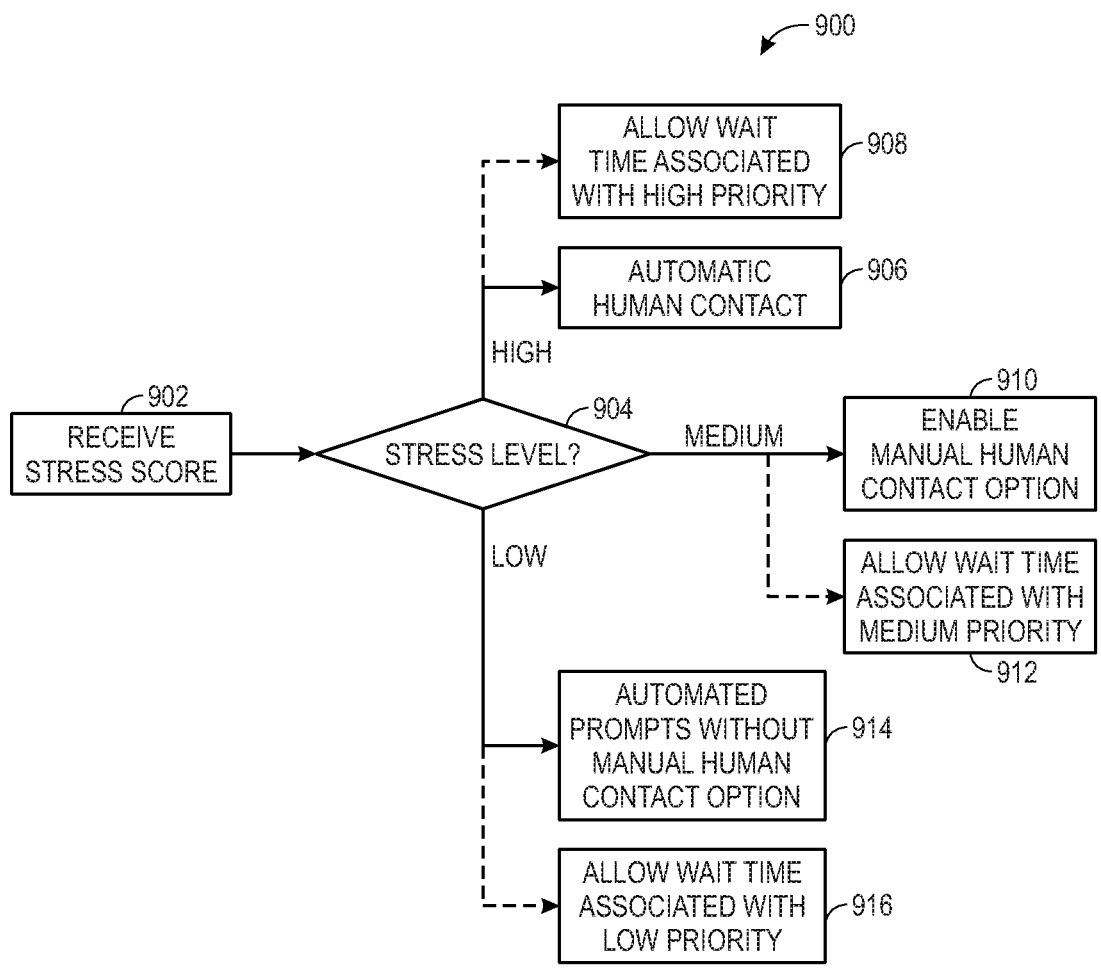
FIGS. 9 and 10 are flowcharts, illustrating examples of dynamic routing possible using the derived factors discussed herein, in accordance with an embodiment of the present disclosure.
Figure 10:
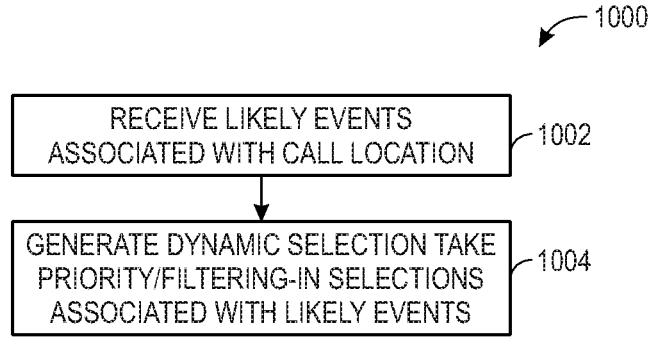

FIGS. 9 and 10 are flowcharts, illustrating examples of dynamic routing possible using the derived factors discussed herein, in accordance with an embodiment of the present disclosure. The process 900 of FIG. 9 begins by receiving a stress score (block 902). A determination is made as to a rank of stress level at decision block 904. In some embodiments, for high ranking stress levels automatic human contact can be provided (block 906) or an allowed wait time for high priority calls may be provided via a routing tree (by modifying the routing tree and/or placing the call in a high priority position in a wait queue) (block 908).

For medium rank stress levels, in some embodiments, a manual human contact option may be provided (block 910). For example, the automated system may prompt the user to "press 0 to talk to a representative." In some embodiments, such a stress level ranking allows for a wait time associated with a medium priority call (e.g., by modifying a routing tree to facilitate such a wait time or placing the call in a medium position in the wait queue) (block 912).

For low rank stress levels, in some embodiments, automated prompts without a manual human contact option may be provided (block 914). For example, the automated system may not provide or may provide a delayed an option to the user to reach a representative, at least for a certain amount of time. In some embodiments, once a threshold amount of time has been reached, a human representative option may be provided to the user. In some embodiments, such a stress level ranking allows for a wait time associated with a low priority call (e.g., by modifying a routing tree to facilitate such a wait time or placing the call in a low priority position in a waiting queue) (block 916).

As may be appreciated, the current system may provide an improved automated telephony system that routes calls based upon machine-learning. Not only can caller receive a more personalized automated call experience, but by automated filtering of routing options, a single automated telephony system may be used for an increasing number of functions, reducing unnecessary costs associated with multiple automated systems used to perform different tasks.

The process 1000 of FIG. 10 begins by receiving likely events associated with the call location (block 1002). From there, dynamic routing selections and/or prioritizations may be generated based upon the likely events (block 1004). For example, high priority calls may be placed in a prioritized wait queue for speaking to a human representative.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   an automated telephony system, configured to facilitate functions desired by a caller, via an automated call with the caller;
   a machine-learning analysis system configured to:
      extract data from the automated call;
      perform machine-learning via the extracted data to identify a likely motivation associated with the automated call;
      perform machine-learning via the extracted data to identify a stress level based on speech characteristics of the extracted data and an indication of external activities occurring within a threshold period of time with respect to the automated call;

and
provide the stress level and the likely motivation to the automated telephony system;
wherein the automated telephony system is configured to:
dynamically route the automated call based upon the stress level and the likely motivation, by:
when the stress level is above a high value threshold, automatically forward the caller to a human representative associated with the likely motivation, independent of a user input;
when the stress level is above a medium value threshold, placing the caller in a medium priority position of a wait queue to reach the human representative associated with the likely motivation, independent of the user input; and
otherwise, when the stress level is below the medium value threshold, placing the caller in a low priority position in the waiting queue to reach the human representative.

2. The system of claim 1, wherein the automated telephony system is configured to:
identify a confidence score associated with the likely motivation; and
dynamically route the automated call based upon the confidence score associated with the likely motivation by:
when the confidence score is above a confidence threshold, automatically forwarding the automated call to a target associated with the likely motivation, independent of the user input indicating feedback associated with the likely motivation; and
otherwise, when the confidence score is below the confidence threshold, providing a prompt requesting the user input indicating feedback associated with the likely motivation.

3. The system of claim 2, wherein the machine-learning analysis system configured to change the prompt based in part upon changes in the likely motivation.

4. The system of claim 1, wherein the automated telephony system comprises a manual option for the caller to reach the human representative when the stress level is above the medium value threshold.

5. The system of claim 1, wherein the speech characteristics comprise a speech timbre, speech pitch, speech loudness, word spacing, or any combination thereof.

6. The system of claim 1, wherein the extracted data comprises characteristics of an origination node of the automated call, and wherein the characteristics are used to identify the likely motivation of the caller, the stress level of the caller, or both, wherein the origination node comprising a point or pathway used to access the automated telephony system.

7. The system of claim 6, wherein the characteristics of the origination node comprise an identity of the origination node, wherein the identity of the origination node provides the stress level with respect to other origination nodes.

8. The system of claim 1, wherein the extracted data comprises an indication of a location where the automated call was made.

9. The system of claim 1, wherein the machine-learning analysis system configured to
identify the likely motivation based at least in part upon the external activities.

10. The system of claim 1, wherein the external activities are identified based upon electronic financial transactions retrieved via a financial transactions application programming interface (API).

11. A tangible, non-transitory, computer-readable medium, comprising computer-readable instructions that, when executed by one or more processors of a computer, cause the computer to:
request a machine-learning prediction of likely motivation for an automated call between a caller and an automated telephony system, by providing, to a machine-learning analysis system, data from the automated call;
request a machine-learning prediction of a stress level for the automated call based on speech characteristics of the data from the automated call and an indication of external activities occurring within a threshold period of time with respect to the automated call;
and
dynamically route the automated call based upon the machine-learning prediction of the likely motivation, the stress level, or both, by:
when the stress level is above a high value threshold, automatically forwarding the caller to a human representative, independent of a user input indicating feedback associated with the likely motivation when the stress level is above the high value threshold;
when the stress level is above a medium value threshold, placing the caller in a medium priority position of a wait queue to reach the human representative; and
otherwise, placing the caller in a low priority position of the wait queue to reach the human representative.

12. The tangible, non-transitory, computer-readable medium of claim 11, comprising computer-readable instructions that, when executed by the one or more processors, cause the computer to
dynamically route the automated call by providing a manual option for the caller to reach a human representative when the stress level is above the medium value threshold.

13. The tangible, non-transitory, computer-readable medium of claim 11, wherein the speech characteristics comprise a speech timbre, speech pitch, speech loudness, word spacing, or any combination thereof of the automated call.

14. A computer-implemented method, comprising:
requesting a machine-learning prediction of a likely motivation of a caller by providing, to a machine-learning analysis system, data from an automated call;
requesting a machine-learning prediction of a stress level based on speech characteristics from the data from the automated call and an indication of external activities occurring within a threshold period of time with respect to the automated call; and
in response to the requests, dynamically routing, by adjusting automated call prompts, the automated call based upon the machine-learning prediction of the stress level and the likely motivation, by:
when the stress level is above a high stress threshold, automatically forward the caller to a human representative associated with the likely motivation, independent of a user input indicating feedback associated with the likely motivation;
when the stress level is above a medium stress threshold, place the caller in a medium priority position of a wait queue to reach the human representative; and
otherwise, when the stress level is below the medium stress threshold, placing the caller in a low priority position of the wait queue to reach the human representative.

15. The computer-implemented method of claim 14, comprising adjusting a priority position in the wait queue based upon the stress level.

16. The system of claim 6, wherein the identity of an origination node comprises a particular one of a plurality of telephone numbers that are available to access the automated telephony system.

17. The system of claim 8, wherein the machine-learning analysis system is configured to determine the stress level based at least in part upon the location where the automated call was made.

18. The computer-implemented method of claim 14, comprising:

receiving, from the machine-learning analysis system, the machine-learning prediction of the likely motivation and identifying a confidence score associated with the likely motivation; and dynamically routing, by adjusting the automated call prompts, the automated call based upon the machine-learning prediction of the likely motivation, by:

when the confidence score is above a confidence threshold, automatically forward the caller to a target associated with the likely motivation; and otherwise, when the confidence score is below the confidence threshold, providing a prompt requesting the user input indicating feedback associated with the likely motivation.

19. The system of claim 4, wherein the automated telephony system is configured to not to present the manual option when the stress level is below the medium value threshold.

20. The system of claim 19, wherein the automated telephony system is configured to present the manual option in response to lapse of a threshold amount of time.

\* \* \* \* \*

UNITED STATES PATENT AND TRADEMARK OFFICE
CERTIFICATE OF CORRECTION

PATENT NO. : 11,641,424 B1
APPLICATION NO. : 17/002508
DATED : May 2, 2023
INVENTOR(S) : Csabi et al.

It is certified that error appears in the above-identified patent and that said Letters Patent is hereby corrected as shown below:

In the Specification

1. In Column 3, Line 4, delete "external" and insert -- externally --, therefor.

2. In Column 4, Line 20, delete "such as" and insert -- (such as --, therefor.

3. In Column 5, Line 9, delete "of the of the" and insert -- of the --, therefor.

4. In Column 6, Line 23, delete "an option" and insert -- option --, therefor.

In the Claims

5. In Column 7, Line 37, in Claim 3, delete "configured" and insert -- is configured --, therefor.

6. In Column 7, Line 61, in Claim 9, delete "configured" and insert -- is configured --, therefor.

7. In Column 10, Line 11, in Claim 19, delete "to not to" and insert -- to not --, therefor.

Signed and Sealed this
Twenty-ninth Day of August, 2023

Katherine Kelly Vidal
*Director of the United States Patent and Trademark Office*